(12) United States Patent
Acharya et al.

(10) Patent No.: US 10,984,027 B2
(45) Date of Patent: Apr. 20, 2021

(54) TECHNIQUES FOR USER-CENTRIC DOCUMENT SUMMARIZATION

(71) Applicant: SRI International, Menlo Park, CA (US)

(72) Inventors: Girish Acharya, Redwood City, CA (US); John Niekrasz, Bonita, CA (US); John Byrnes, Poway, CA (US); Chih-Hung Yeh, Alameda, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/088,745

(22) PCT Filed: Nov. 11, 2016

(86) PCT No.: PCT/US2016/061558
§ 371 (c)(1),
(2) Date: Sep. 26, 2018

(87) PCT Pub. No.: WO2017/184204
PCT Pub. Date: Oct. 26, 2017

(65) Prior Publication Data
US 2019/0114298 A1    Apr. 18, 2019

Related U.S. Application Data

(60) Provisional application No. 62/324,818, filed on Apr. 19, 2016.

(51) Int. Cl.
*G06F 16/33* (2019.01)
*G06F 16/9535* (2019.01)
(Continued)

(52) U.S. Cl.
CPC ........ *G06F 16/3334* (2019.01); *G06F 16/345* (2019.01); *G06F 16/9535* (2019.01);
(Continued)

(58) Field of Classification Search
None
See application file for complete search history.

(56) References Cited

U.S. PATENT DOCUMENTS 3,548,381 A * 12/1970 Dirks ..................... G11B 5/008
                                                    712/221
5,265,065 A * 11/1993 Turtle ................. G06F 16/3346
(Continued)

FOREIGN PATENT DOCUMENTS

| CA | 2287873 A1 | 9/1999 |
| JP | H11184865 | 7/1999 |
| JP | 2006178978 A | 7/2006 |

OTHER PUBLICATIONS

The International Bureau of WIPO, "Preliminary Report on Patentability", in application No. PCT/US2016/061558, dated Nov. 1, 2018, 5 pages.

(Continued)

*Primary Examiner* — Kim T Nguyen
(74) *Attorney, Agent, or Firm* — Hickman Becker Bingham Ledesma LLP; Christine E. Orich

(57) ABSTRACT

Disclosed techniques can generate content object summaries. Content of a content object can be parsed into a set of word groups. For each word group, at least one topic to which the word group pertains can be identified and it can be determined, via a user model, at least one weight of the plurality of weights corresponding to the topic(s). For each word group, a score can be determined for the word group based on the weight(s). A subset of the set of word groups can be selected based on the scores for the word group. A summary of the content object can be generated that includes the subset but that does not include one or more other word groups in the set of word groups that are not in the subset. At least part of the summary of the content object can be output.

20 Claims, 5 Drawing Sheets

(51) Int. Cl.
  *G06F 16/34* (2019.01)
  *G06F 40/20* (2020.01)
  *G06F 40/205* (2020.01)
  *G06F 40/258* (2020.01)

(52) U.S. Cl.
  CPC ............ *G06F 40/20* (2020.01); *G06F 40/205* (2020.01); *G06F 40/258* (2020.01)

(56) References Cited

U.S. PATENT DOCUMENTS

| | | | |
|---|---|---|---|
| 5,708,825 A | | 1/1998 | Sotomayor |
| 7,607,083 B2* | | 10/2009 | Gong ...................... G06F 40/20 715/254 |
| 8,577,884 B2* | | 11/2013 | Poteet .................... G06Q 30/02 707/737 |
| 8,977,613 B1* | | 3/2015 | Cooke ................ G06F 16/9535 707/732 |
| 9,195,640 B1* | | 11/2015 | Donneau-Golencer ...................... G06F 16/35 |
| 2002/0105532 A1 | | 8/2002 | Oblinger |
| 2004/0225667 A1* | 11/2004 | Hu ........................ G06F 16/345 |
| 2005/0114325 A1 | 5/2005 | Liu et al. |
| 2009/0307213 A1* | 12/2009 | Deng ...................... G06F 16/35 |
| 2014/0129542 A1 | 5/2014 | Haveliwala et al. |
| 2015/0039580 A1 | 2/2015 | Subhedar |
| 2016/0063122 A1* | 3/2016 | Asur .................... G06F 16/2477 707/725 |

OTHER PUBLICATIONS

Current Claims in application No. PCT/US2016/061558, dated Nov. 2018, 7 pages.
The International Searching Authority, "Search Report" in application No. PCT/US2016/061558, dated Mar. 23, 2017, 6 pages.
Manabu Okumura et al., "Automated Text Summarization: A Survey," Natural Language Processing, The Association for Natural Language Processing, Jul. 10, 1999, vol. 6 No. 6 pp. 1-26.
Japanese Patent Office, "Notice of Grounds for Rejection" in application No. 2018-552810, dated Sep. 11, 2019, 5 pages.
Japanese Claims in application No. 2018-552810, dated Sep. 2019, 7 pages.

* cited by examiner

TECHNIQUES FOR USER-CENTRIC DOCUMENT SUMMARIZATION

CROSS-REFERENCE TO RELATED APPLICATIONS

This application is a U.S. National Stage Patent Application filed under 35 U.S.C. § 371 of International Patent Application No. PCT/US2016/061558 filed Nov. 11, 2016, which claims priority to U.S. Provisional Application 62/324,818 filed on Apr. 19, 2016, the entire contents of all of which are hereby incorporated by reference as if fully set forth herein for all purposes.

BACKGROUND

Frequently, various technologies (e.g., search engines, virtual personal assistants, and web browsing) are being used to communicate information from a source to a user device. However, the amount of information available for communication to user devices far exceeds an amount of information that can be received at a given user device and/or processed by a user. Thus, many systems have been developed to aid users in accessing desired content objects. For example, search engines use techniques to identify a subset of a set of content objects that may pertain to a given search query and to further rank the results.

SUMMARY

In addition to identifying which content objects may be relevant to a search query, it can also be useful to identify which portions of an individual content object may be relevant to a search query. These portions may be used to generate a summary of the content object. The summary may include one or more word groups (e.g., fragments, sentences, paragraphs and/or sections) from the content object predicted to be relevant to a search query. One approach for generating the summary is to identify one or more first paragraphs, sentences or words from the content object. However, such a summary can neglect data that is selectively included further down in the object.

In some embodiments, a content-object summary is produced based on previous activity data for a user associated with a query. For example, for a given user, training data can be identified that relates to past activity for the user. The past activity can identify (for example) search queries, requests for particular data, which of one or more search results a user selected (e.g., clicked on and/or requested), Internet browsing history, which of one or more intra-webpage links a user selected, products purchased (e.g., online) by the user and/or media consumption history (e.g., which video and/or audio files were requested, bought, watched and/or listened to). The past activity can include data from one or more interfaces or devices (e.g., via interaction with one or more virtual assistants, search engines, browsers, or media sources, and/or any combination thereof). The training data can be processed to identify, for each topic and/or feature of one or more topics and/or features, a user-preference weight that can correspond to a likelihood (and/or predicted extent to which) that a user is interested (or uninterested) in the topic and/or feature (e.g., as gauged by whether the user has chosen to see, read, watch, look at or buy an item associated with the topic and/or feature.

Each of a set of individual word groups in a content object (e.g., webpage, file, website, audio file, e-book, etc.) can also be mapped to one or more features. For example, natural language processing can be used to identify a degree to which words in a word group correspond to each of a set of features, and a metric can be assigned to a combination of the word group and feature based on the degree. Across one or more or all features, the corresponding user-preference weight and the metric can be assessed to generate a score for the word group (e.g., such that the sentence is assigned a higher score when it more strongly maps to features estimated as being preferred by the user).

In some instances, a rule can identify, for example, a number of word groups that are to be included in a content-object summary, and the summary can be generated based on the number and word groups scores. For example, if the rule indicates that the summary is to include 3 sentences, the selection may include identifying the 3 sentences in a content object associated with the highest scores (relative to other sentences in the document). As another example, if the rule indicates that the summary is to include 3 sentences, the selection may include first identifying 6 sentences (e.g., or another multiple, or a number determined based on a number of sentences in the document) and then identifying 3 sentences from amongst the 6 sentences based on (for example) a pseudo-random selection technique, a technique that biases towards feature variability, a technique that biases against (or, in other instances, towards) sentences near each other in the content object, and so on.

In some instances, a rule can identify a score threshold, and the summary can be generated based on the threshold and word group scores. For example, the summary may be generated to include each word group with a score above the threshold.

In some embodiments, a computer-implemented method is provided for generating summaries of content objects in response to queries. A user model associated with a user device can be retrieved. The user model can include a plurality of weights. Each weight of the plurality of weights can represent a bias of a user associated with the user device towards or against accessing content corresponding to a topic. A content object can be identified. Content of the content object can be parsed into a set of word groups. For each word group of the set of word groups, at least one topic to which the word group pertains can be identified and it can be determined, via the user model, at least one weight of the plurality of weights. Each of the at least one weight can be associated with a corresponding topic of the at least one topic. For each word group of the set of word groups, a score can be determined for the word group based on the at least one weight. A subset of the set of word groups can be selected based on the scores for the word group. A summary of the content object can be generated that includes the subset but that does not include one or more other word groups in the set of word groups that are not in the subset. At least part of the summary of the content object can be output.

In some embodiments, a system is provided for generating summaries of content objects in response to queries. The system can include one or more data processors and a non-transitory computer readable storage medium containing instructions which when executed on the one or more data processors, cause the one or more data processors to perform part or all of one or more methods disclosed herein.

In some embodiments, a computer-program product tangibly embodied in a non-transitory machine-readable storage medium is provided. The computer-program product can include instructions configured to cause one or more data processors to perform part or all of one or more methods disclosed herein.

The following detailed description together with the accompanying drawings will provide a better understanding of the nature and advantages of the present invention.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
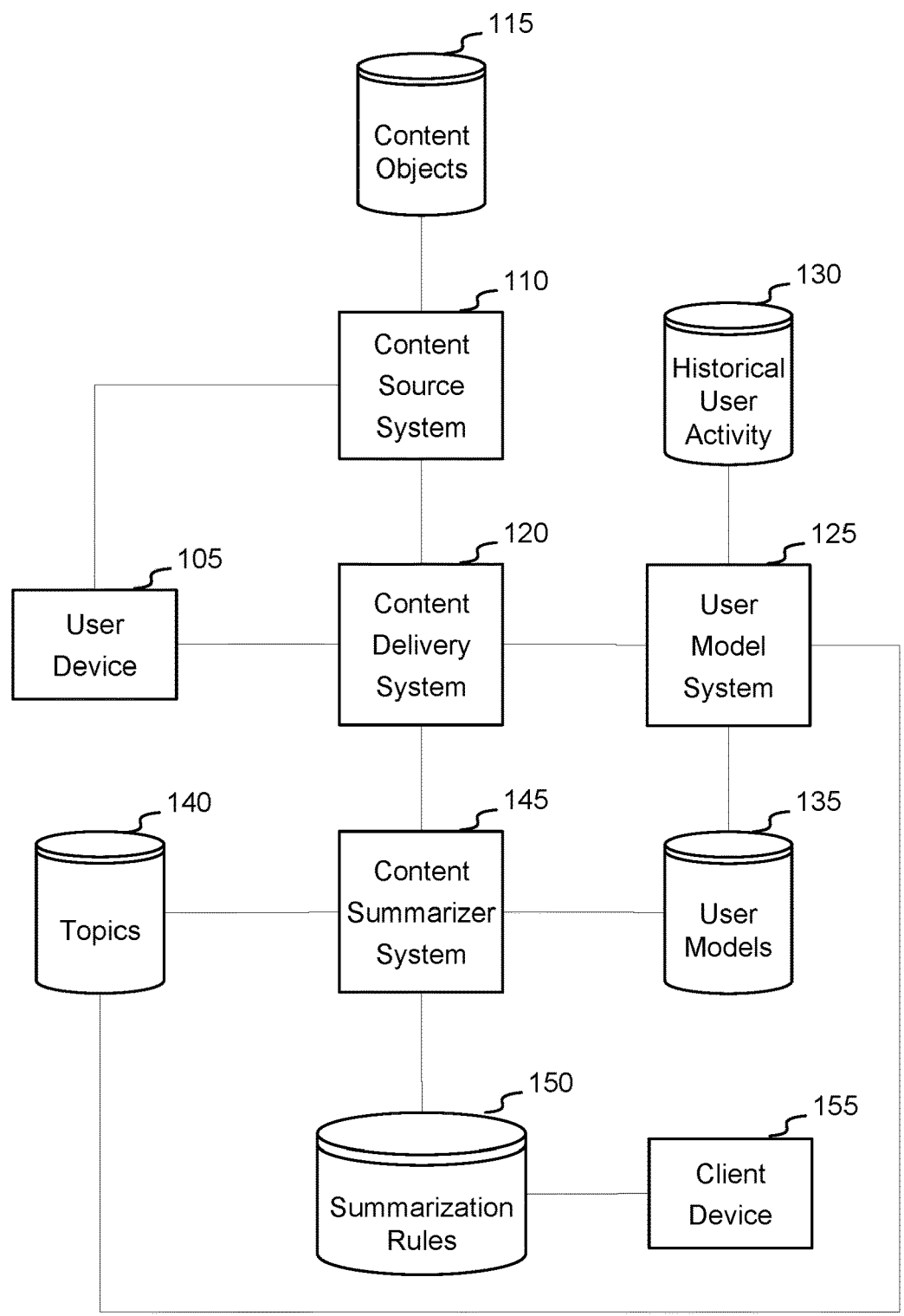
FIG. 1 shows a block diagram of an embodiment of an interaction system in accordance with an embodiment of the invention.

Referring first to FIG. 1, a block diagram of an embodiment of an interaction system 100. Interaction system includes a user device 105, which can include (for example) a desktop computer, laptop, tablet, smart wearable device, smart phone, or smart home device. User device 105 can include an input component (e.g., a microphone, camera, keyboard, touch screen, or cursor control) configured to accept inputs from a user. An input can correspond to a query, which can include (for example) a question, a request, and/or one or more subjects. For example, a microphone on user device 105 may receive a spoken input from a user that includes a question, which can be preliminarily processed via execution of a virtual assistant code operating on user device 105. User device 105 can also include an output component (e.g., a speaker or display) configured to present outputs (e.g., as at least partly generated and/or processed by execution of the virtual assistant code) to a user. An output can include and/or correspond to a result of the query.

User device 105 can include a transmitter (e.g., antenna) to transmit query data corresponding to a content source system 110. Content source system 110 can be configured to access content objects from one or more content object data stores 115 and to identify one or more content objects corresponding to the query. For example, content source system 110 can identify a content object (for example) by using one or more searching techniques and/or assessing metadata from a set of content objects. In some instances, content object data stores 115 include one or more data stores managed by one or more web servers and include data for webpage content objects. Content source system 110 can identify a content object based on a user preference (e.g., effecting an initial search or a processing of search results (e.g., via filtering or ordering) based on a user preference).

Content source system 110 can identify the one or more content objects determined to be responsive to the query to a content delivery system 120. Content delivery system 120 can process each of the one or more content objects to generate a result of the query to be transmitted to user device 105. Content delivery system 120 can also communicate with a user model system 125 to facilitate updating of a user model. More specifically, content delivery system 120 can identify content objects with which a user interacted, content objects which were at least partly presented at user device 105, and/or content transmitted from user device 105 (e.g., corresponding to a text, email, blog post, etc.) via receiving a communication from content source system 110 and/or user device 105. Content delivery system 120 can identify (and/or transmit) the content object(s) and/or content and may further identify an interaction type to user model system 125.

User model system 125 can identify one or more topics corresponding to the content and/or content object and can characterize an event associated with a content object (e.g., as an exposure event, positive interaction, negative interaction, etc.). User model system 125 can update a historical user activity data store 130 based on the characterizations. Historical user activity data store 130 can include data for each of one or more users. The data can identify (for example) particular content objects and/or content that was at least partly presented to, interacted with or generated by the user; one of more topics associated with the content objects and/or content; and/or a characterization of an event corresponding to the content object and/or content.

Using this historical data, user model system 125 can generate, update and/or maintain a user model for each of one or more users. A user model can include—for each of a set of topics—a weight that represents a bias of a user towards or against accessing content corresponding to a topic. For example, the weight can correspond to an estimated interest of the user towards or against a topic. The weight can be determined based on (for example) a number of times a content object corresponding to the topic was access at a user device of the user and/or content corresponding to the topic was generated at a user device of the user. The weight can additionally or alternatively be determined based on a percentage of times that a user positively (or negatively) responded to data corresponding to the topic (e.g., by clicking on a link corresponding to the topic or positively rating a virtual-assistant answer provided that pertains to the topic). The weight can additionally or alternatively be determined based on a number or percentage of search queries, verbal questions or blog posts generated by the user that correspond to the topic. In some instances, weights can be determined using a machine learning technique.

In some instances, a weight for each topic is set to a default value, and default values of at least some topics may then be adjusted based on historical user activity. A default value may be determined based on (for example) historical activity associated with a population of users, a fraction of content objects that correspond to the topic, etc.

A topic data store 140 can maintain a list of topics to be used in user models and/or assessments of content and/or content objects. Topics may be identified using, for example, a clustering technique, machine-learning technique, and/or ontology. For example, for each of multiple content objects, words from the content objects can be used to identify multiple potential topics. Each potential topic can correspond to a node at a level on an ontology. Content objects can then be clustered based on the potential topics. When topics are identified as corresponding to lower-level ontology nodes, clusters will be smaller. At an extreme, small clusters and narrow topics may impede accurate user models and identifying content objects pertaining to a user query and general preferences. Similarly, at the same results may occur at the other extreme. Thus, machine learning may be used to identify one or more levels to be used in the ontology that facilitate generation of a user model and content-object characterization that promotes identifying content that pertains to a user query and is of interest to a user.

A content summarizer system 145 can use a topic list and a user model to generate a summary of a content object. Content summarizer system 145 can parse a content object into a set of word groups. For example, content summarizer system 145 can use a punctuation rule to parse a webpage into a set of sentences. Content summarizer system 145 can map each word group to one or more topics, such as by detecting nouns (and, in some instances, verbs), and looking each noun up in an ontology that associates words with a topic (e.g., associated with a given level or identified as being a topic node). Content summarizer system 145 can determine a score for each word group based on a weight, from a user model, for each of the one or more topics. A subset of the set of word groups can then be identified based on the scores (e.g., by identifying the n most highly scored word groups, identifying each word group with a score above a threshold, etc.). In some instances, the subset is further modified based on a grammar rule. For example, if multiple word groups in the subset correspond to consecutive positions in a content object, one or more of the multiple word groups (e.g., associated with one or more later positions) may be omitted. As another example, if a word group includes a pronoun at a beginning of the word group, a word group at a preceding position may be added to the subset.

A summarization rule data store 150 can include one or more summarization rules to be effected by content summarizer system 145. A summarization rule may (for example) identify a number of word groups to be included in a summary, a score threshold, a technique for ordering word groups in a summary (e.g., in accordance with relative position in a content object and/or based on their scores), and/or a rule for modifying a score-based subset. A summarization rule can be defined based, at least in part, on input received from a client device 155. Thus, in at least some instances, a summarization rule can be client-specific.

Content summarizer system 145 can avail a summary to content delivery system 120, which can perform any processing on the summary and transmit the summary to user device 105. For example, content delivery system 120 may identify that a summary is responsive to a question having been received via an audio signal detected by a virtual assistant at user device 105, and content delivery system 120 may then transform a textual summary into an audio file.

It will be appreciated that two or more systems depicted in FIG. 1 may, but need not, be integrated into a single system. It will further be appreciated that each of one, more or all systems depicted in FIG. 1 (and/or combinations thereof) may include a system in the cloud and/or one or more remote servers.

Figure 2:
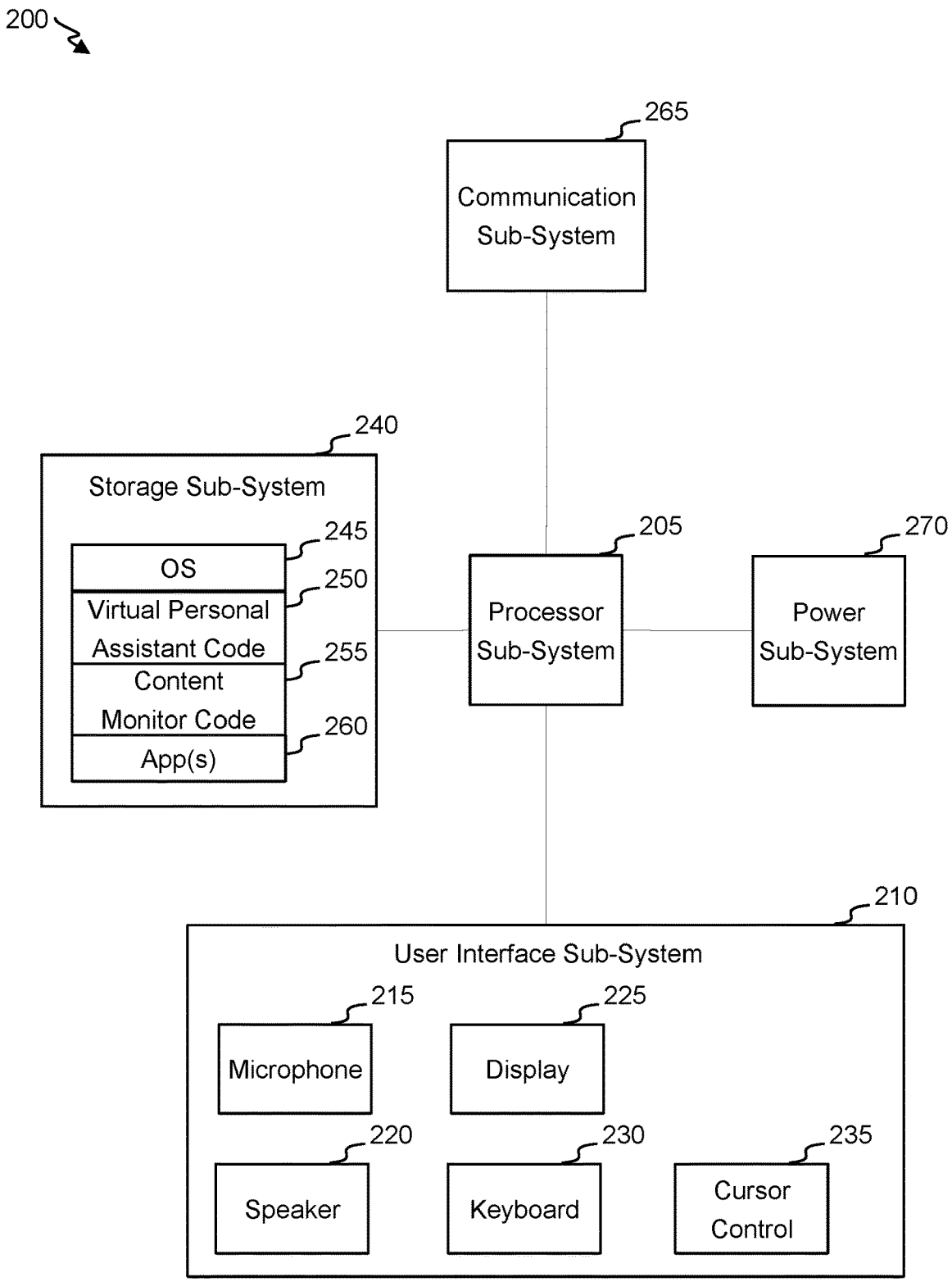
FIG. 2 shows a block diagram of an example of a user device in accordance with an embodiment of the invention.

Referring next to FIG. 2, a block diagram is shown of an example of a user device 200 in accordance with an embodiment of the invention. In some instances, user device 200 can correspond to user device 105, such that user device 105 includes some or all of the components depicted in FIG. 2.

User device 200 can include a processor sub-system 205, which can be configured to execute code, execute instructions and/or control an operation of one or more components of user device 200. Processor sub-system can include one or more processors, which can be implemented (for example) as one or more integrated circuits, one or more single-core or multi-core microprocessors or one or more microcontrollers.

User device 200 can include a user interface sub-system 210, which can include various input components to receive inputs from a user and/or output components to present outputs to a user. User interface sub-system 210 can include a microphone 215, which can convert ambient audio signals (e.g., a voice signal from a user) to electrical signals. User interface sub-system 210 can also include a speaker 220, which can convert electrical signals into audio signals (e.g., voice signals, tones, music, etc.). User interface sub-system 210 can include a display 225, which can present visual information (e.g., text, graphics, animations, videos, etc.). Display 225 can include a screen with a grid of pixels configured to illuminated in accordance with instructions specifying a temporal, spatial, intensity and/or color configuration. User interface sub-system 230 can include a keyboard, configured to detect presses on particular keys (e.g., representing letters, numbers, function keys, etc.). User interface sub-system 210 can include a cursor control, configured to receive inputs indicating where a cursor is to be positioned, how a cursor is to move and/or whether to "click on" or otherwise select an option on the screen. An exemplary cursor control can include (for example) a mouse, trackpad or touchscreen (with can correspond to a combination of cursor control 235 and display 225).

User device 200 can include a storage sub-system 240, which can include memory and/or non-transitory storage medium. Storage sub-system 240 can include (for example) magnetic storage media, flash memory, or semiconductor memory, such as DRAM or SRAM. Storage sub-system 240 can include volatile and/or non-volatile storage media.

Storage sub-system 240 can store various codes (e.g., including execution instructions) and/or data stores. Storage sub-system 240 can store an operating system (OS) 245 configured to support basic functions, such as task scheduling, application execution, resource management, and/or peripheral control. Storage sub-system 240 can store a virtual personal assistant code 250 configured to receive and respond to queries from a user. For example, virtual personal assistant code 250 may be configured to detect particular vocal queries received at microphone 215. Vocal queries may be detected when (for example) virtual personal assistant code 250 is executing and/or an input (e.g., vocal query, virtual or mechanical button press, etc.) has triggered initiation of a query or execution of virtual personal assistant code 250. Virtual personal assistant code 250 may be configured to process a query by (for example) identifying a content object that pertains to the query and outputting at least part of the content object. The output may correspond to a a generated summary of the content object, which may include (for example) an incomplete subset of word groups (e.g., sentences) in the content object. The summary may be generated based on (for example) the query, a user model, a context of the query (e.g., one or more communications received prior to the query during a same session), organization of word groups in the content object, and/or topics to which word groups in the content object pertain. The summary may be generated in its entirety locally at user device 200 or at least partly generated remotely (e.g., at a remote server). The summary may be output via (for example) speaker 220 or display 225. Virtual personal assistant code 250 can correspond to one or more features of a virtual personal assistant disclosed in U.S. application Ser. No.

15/322,494, file on Oct. 24, 2016, which is hereby incorporated by reference for all purposes.

Storage sub-system 240 can include a content monitor code 255 configured to monitor which content objects are accessed at user device 200 and/or which content is generated at and/or transmitted by user device 200. Content monitor code 255 can include, for example, code for a daemon that is to operate in a background (e.g., always or when one or more particular apps are executing) to detect defined events (e.g., such as content requests, content presentations, and/or content interactions). In some instances, the content monitored is content associated with one or more apps 260 installed on user device 200. For example, content can include a webpage accessed via a browser app, a search performed using a browser app, and/or content posted on a social-media site or channel. Content may include a query processed by execution of virtual personal assistant code 250 and/or content output by execution of virtual personal assistant code 250.

Content monitor code 255 can be configured to detect responses to content that has been partly or fully presented. For example, content monitor code 255 can be configured to detect search results that are presented and which ones are (and/or aren't) selected. As another example, content monitor code 255 can be configured to detect when a user positively responds to a content object (e.g., by requesting a "Tell Me More" option, selecting a "Show Similar Results" option, for staying on a webpage for an above-threshold period of time, or by sharing the content object on a social-media site or channel) or when a user negatively responds to a content object (e.g., by rephrasing a query or by staying on a webpage for a below-threshold period of time).

User device 200 can include a communication sub-system 265, which can enable communications to be transmitted from user device 200 and received by user device 200 (e.g., over a network, such as over the Internet or Local Area Network). For example, communication sub-system 265 can include an RF transceiver (e.g., antenna) and/or circuitry to enable data communication over a wireless medium. Communication sub-system 265 can also or alternatively include one or more ports to enable data communications over a wired network.

User device 200 can include a power sub-system 270, which can facilitate providing power to user device 200. Power sub-system may include, for example, a battery and/or a plug to receive a cord that transmits power from an AC source.

Figure 3:
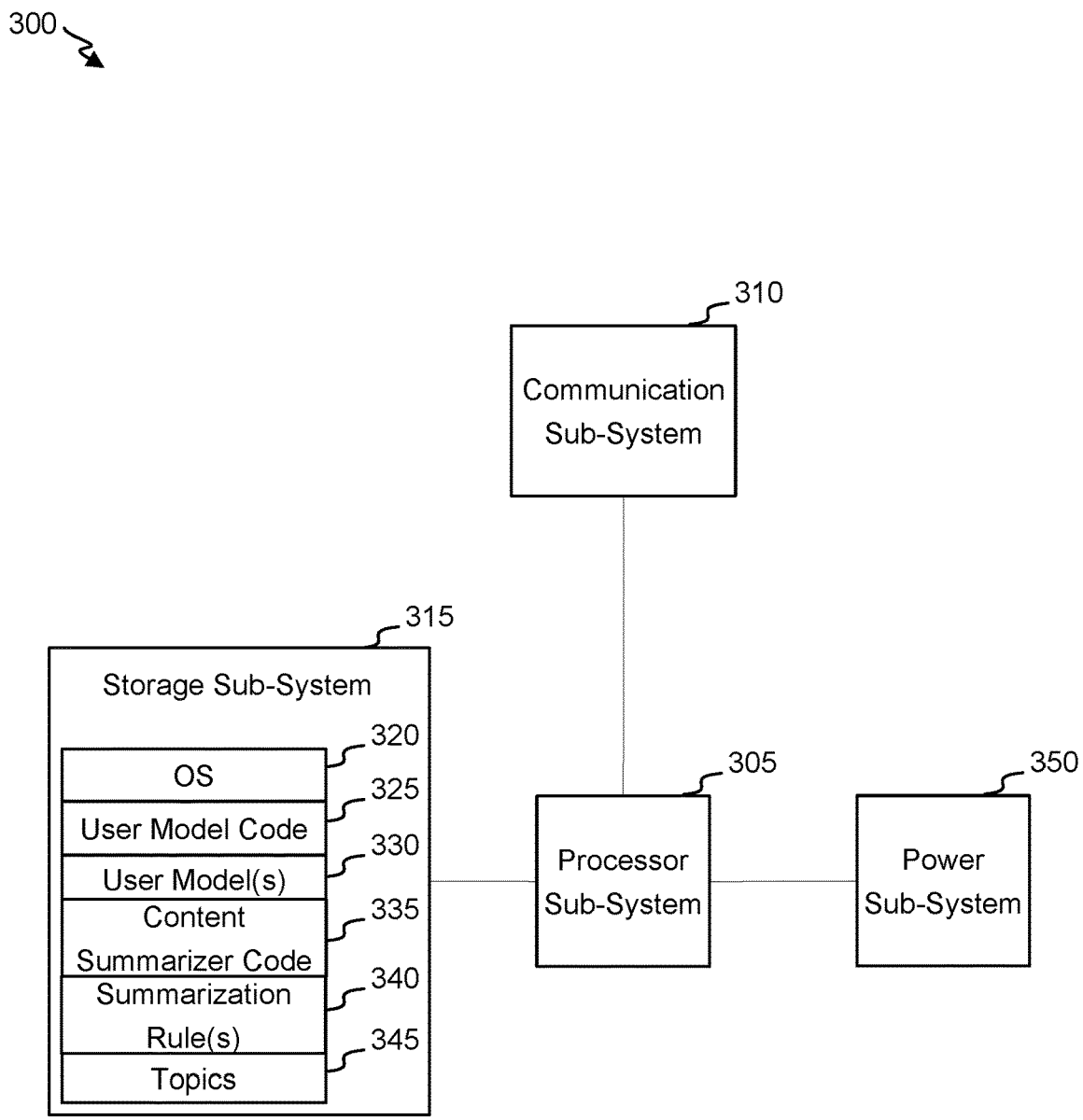
FIG. 3 shows a block diagram of an example of a server system in accordance with an embodiment of the invention.

Referring next to FIG. 3, a block diagram of an example of a server system 300 in accordance with an embodiment of the invention is shown. Server system 300 can include, for example, a single server, multiple servers (e.g., that are co-located and/or separated), and/or a server farm. In instances where server system 300 includes multiple servers or devices, it will be appreciated that one or more of the depicted components may be present on two, more or all of the multiple servers or devices. In some instances, server system 300 can correspond to user model system 125 and/or content summarizer system 145, Server system 300 can include a processor sub-system 305, which can be configured to execute code, execute instructions and/or control an operation of one or more components of server system 300. Processor sub-system can include one or more processors, which can be implemented (for example) as one or more integrated circuits, one or more single-core or multi-core microprocessors or one or more microcontrollers.

Server system 300 can include a communication sub-system 310, which can enable communications to be transmitted from server system 300 and received by server system 300 (e.g., over a network, such as over the Internet or Local Area Network). For example, communication sub-system 310 can include an RF transceiver (e.g., antenna) and/or circuitry to enable data communication over a wireless medium. Communication sub-system 310 can also or alternatively include one or more ports to enable data communications over a wired network. In some instances, server system 300 can receive one or more communications from a user device and/or transmit one or more communications to a user device via communication sub-system 310. Such communications can (for example) facilitate generation of a user model, generation of a content summary and/or execution of a virtual personalized assistant code.

Server system 300 can include a storage sub-system 315, which can include memory and/or non-transitory storage medium. Storage sub-system 315 can include (for example) magnetic storage media, flash memory, or semiconductor memory, such as DRAM or SRAM. Storage sub-system 315 can include volatile and/or non-volatile storage media.

Storage sub-system 315 can store various codes (e.g., including execution instructions) and/or data stores. Storage sub-system 315 can store an operating system (OS) 320 configured to support basic functions, such as task scheduling, application execution, resource management, and/or peripheral control. Storage sub-system 315 can store a user model code 325 configured to generate and/or update a user model corresponding to a user and/or user device, which can be stored in a user model data store 330. The user model may estimate a degree to which a user prefers or does not prefer content corresponding to each of one or more topics. Thus, the user model may include a weight for each of a set of topics, and the weight may indicate an extent to which (for example) a user accessed, requested, generated and/or positively responded to content pertaining to the topic relative to an extent to which content pertaining to the topic was generally available. This determination can be made (for example) by identifying baseline data indicating, for each of a set of content objects, to which one or more topics the content object pertains. Further, it can be determined as to with which of the set of content objects a user interacted with and the character of the interaction. To illustrate, weights for topics of content objects returned in response to a response query may be incremented, weights for topics of content objects selected by (e.g., clicked on by) a user may be incremented, and/or weights for topics of content objects can be adjusted in response to a user review of the content objects (e.g., of being of interest or relevant). Weights for topics may further be adjusted based on baseline exposure data. For example, if 10 content objects were presented to a user, 8 of which pertained to basketball, 1 of which pertained to football, and 1 of which pertained to hockey, and if a user selected the hockey content object, a weight for "hockey" may be incremented by a higher magnitude than a weight for "basketball" would have been incremented given a contrary selection.

Execution of a content summarizer code 335 can use user model 330 to generate a summary of a content object. A content object can include on returned by a search engine and/or identified in response to a query (e.g., a verbal query presented by a user). A content object can correspond to (for example) an electronic content object, such as a webpage.

A content object can be parsed into a plurality of word groups. Each word group can be assigned a score based on (for example) its position within the content object (e.g., where higher scores are assigned to word groups higher in the content object), which topic(s) to which the word group pertains, and/or a user-model weight for each of the topic(s) to which the word group pertains. Execution of content summarizer code 335 can use the scores to identify a subset of the set of word groups (e.g., by identifying one or more word groups with scores above an absolute or relative threshold, by identifying one or more word groups with the highest scores in the set, and/or by applying word-group structure logic). A summary can then be generated that (for example) includes the subset of word groups (e.g., arranged in an order corresponding to the position of the word groups in the object or according to scores of the word groups) and/or otherwise based on the subset of word groups.

Content summarizer code 335 can apply one or more summarization rules 340 during generation of the summary. A summarization rule may, but need not, be at least partly defined by a client and/or learned (e.g., using a machine-learning technique). A summarization rule may indicate (for example) a score threshold for inclusion of a word group into a summary, a number of word groups to be included in a summary, a grammar rule for selecting a word group for a summary, a rule for ordering (or summarizing) word groups in a summary, another selection technique or parameter for determining which word groups are to be represented in a summary, another processing technique or parameter for determining how word groups are to be arranged and/or transformed in a summary.

Storage sub-system 315 further includes a topic data store 345, which can include a list of topics to be used in user models and word-group processing. The list may, but need not, be specific to (for example) a client, context and/or user. The list may be (for example) defined at least in part based on an ontology, client input and/or machine learning.

It will be appreciated that one or more of a user model 330, summarization rule 340, and/or topic list may be dynamically updated based on (for example) user data, client input, and/or processing of new content objects.

Server system 300 can include a power sub-system 350, which can facilitate providing power to server system 300. Power sub-system may include, for example, a battery and/or a plug to receive a cord that transmits power from an AC source.

Figure 4:
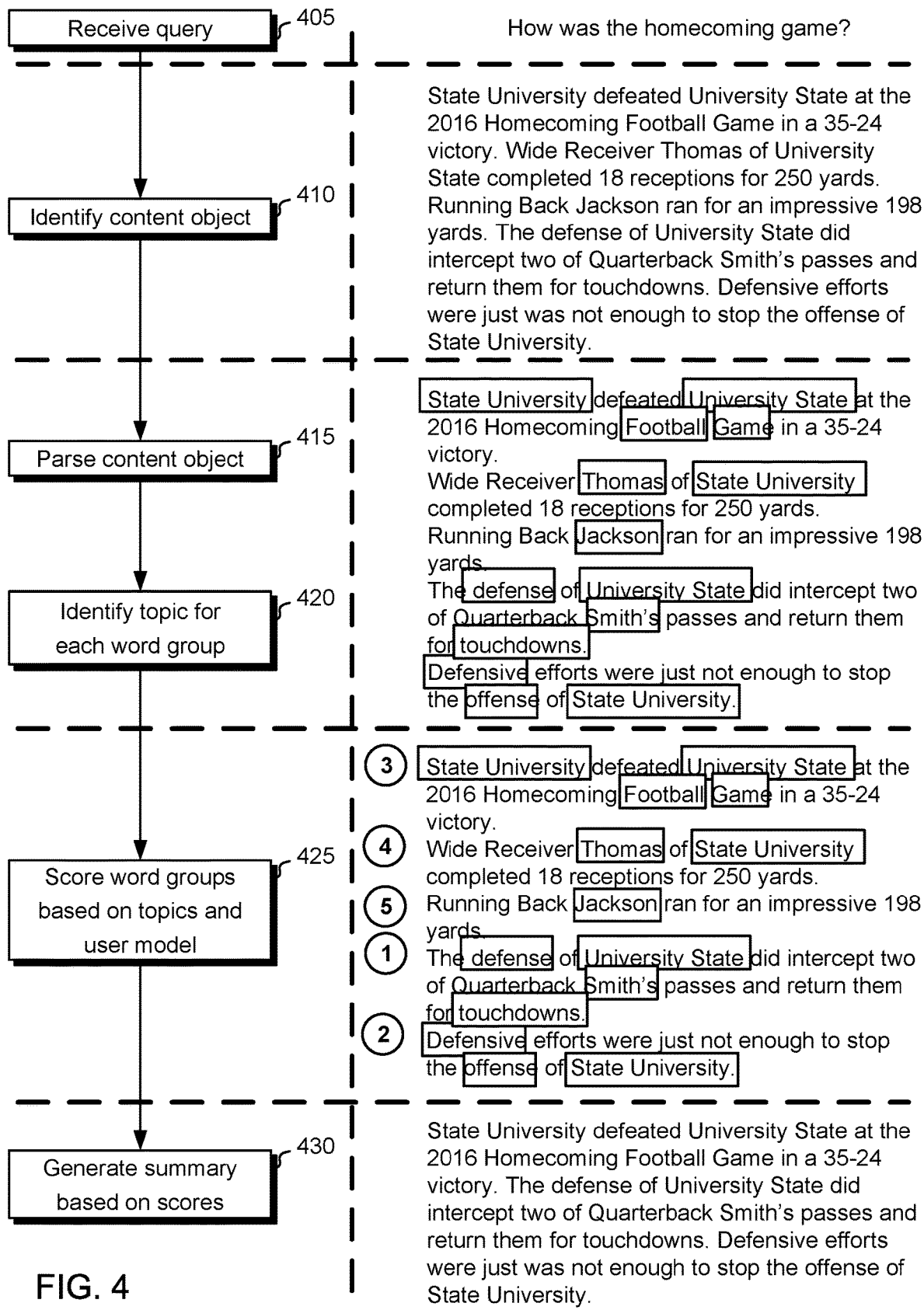
FIG. 4 illustrates a flowchart for a process for generating a content-object summary in accordance with an embodiment of the invention, alongside an illustrative textual processing example.

FIG. 4 illustrates a flowchart for a process for generating a content-object summary in accordance with an embodiment of the invention, alongside an illustrative textual processing example. The illustrated process may be performed by, for example, content source system 110, content delivery system 120 and/or content summarizer system 145.

At block 405, a query is received. For example, content source system or content delivery system 120 can receive a communication that includes the query from a user device. The communication may have been generated (for example) by an application, such as a virtual personal assistant application or a browser application. The application may detect an input (e.g., an audio input or typed input) and generate a query based on the input (e.g., by detecting words in an audio input, by omitting or adding terms to a query, etc.). An example query of "How was the homecoming game?" is shown in FIG. 4.

At block 410, a content object is identified (e.g., by content source system 110) that is responsive to the query (e.g., by content delivery system 120 or content summarizer system 145). The content object can be identified based on a search technique and may depend on a user model associated with a user device. The content object can include, for example, a webpage. FIG. 4 shows text of an example content object that (in this example) has been determined to be responsive to the query.

At block 415, the content object is parsed into a set of word groups. The word groups can include (for example) a fragment, sentence, paragraph, and so on. The parsing can include applying one or more grammar rules. In the example illustrated in FIG. 4, the content is parsed into sentences, as represented by the line break between the sentences.

At block 420, for each word group in the set of word groups, one or more topics are identified (e.g., by content delivery system 120 or content summarizer system 145). Each topic can be determined based on one or more words in the word group. For example, a library of various words, phrases and/or word roots can be used to detect individual corresponding words and/or phrases in text associated with the content object. In the illustrated example, words corresponding to topics are boxed. In some instances, the words can themselves be the topics. In some instances, the words can correspond to a differently named topic.

At block 425, each word group is assigned a score based on the one or more topics of the sentence and a user model associated with a user device from which the request was received (e.g., by content summarizer system 145). The user model may include a weight for various topics, and the score may be generated based on the weight(s) of the topic(s) of the word group. For example, a score may include (or may be based on) an average, maximum, median or sum of the weight(s) of the topic(s) of the word group. The score may also depend on one or more other factors, such as a position of the word group in the content object (e.g., to prioritize earlier word groups in the content object in total, to prioritize earlier word groups in a section or paragraph, or to de-prioritize word groups with multiple pronouns).

Scores can include (for example) rankings, integers, real-numbers, categories, and so on. A score may, but need not, be bounded (e.g., on a scale from 0-1). A score may be normalized (e.g., based on a number of word groups in a content object or scores of other word groups). In the illustrated example, the scores include rankings, such that the highest scored word group corresponds to the word group in a fourth position in the text.

At block 430, a summary is generated based on the score. The summary can include a subset of the set of word groups. The subset can be identified based on the score and a summarization rule. For example, a summarization rule can indicate that a summary is to include three word groups having the highest scores, such that the sentences ranked 1, 2 and 3 in the example are selected for the summary. The summarization rule can further identify an ordering protocol. For example, in the depicted instance, the word groups in the subset are ordered in accordance with their relative positions in the original content object.

In some instances, a rule may indicate that a summary is to include additional information. For example, a rule may indicate that a summary is to begin with a paraphrasing of the query and/or one or more word groups with an earliest position in the content object.

Figure 5:
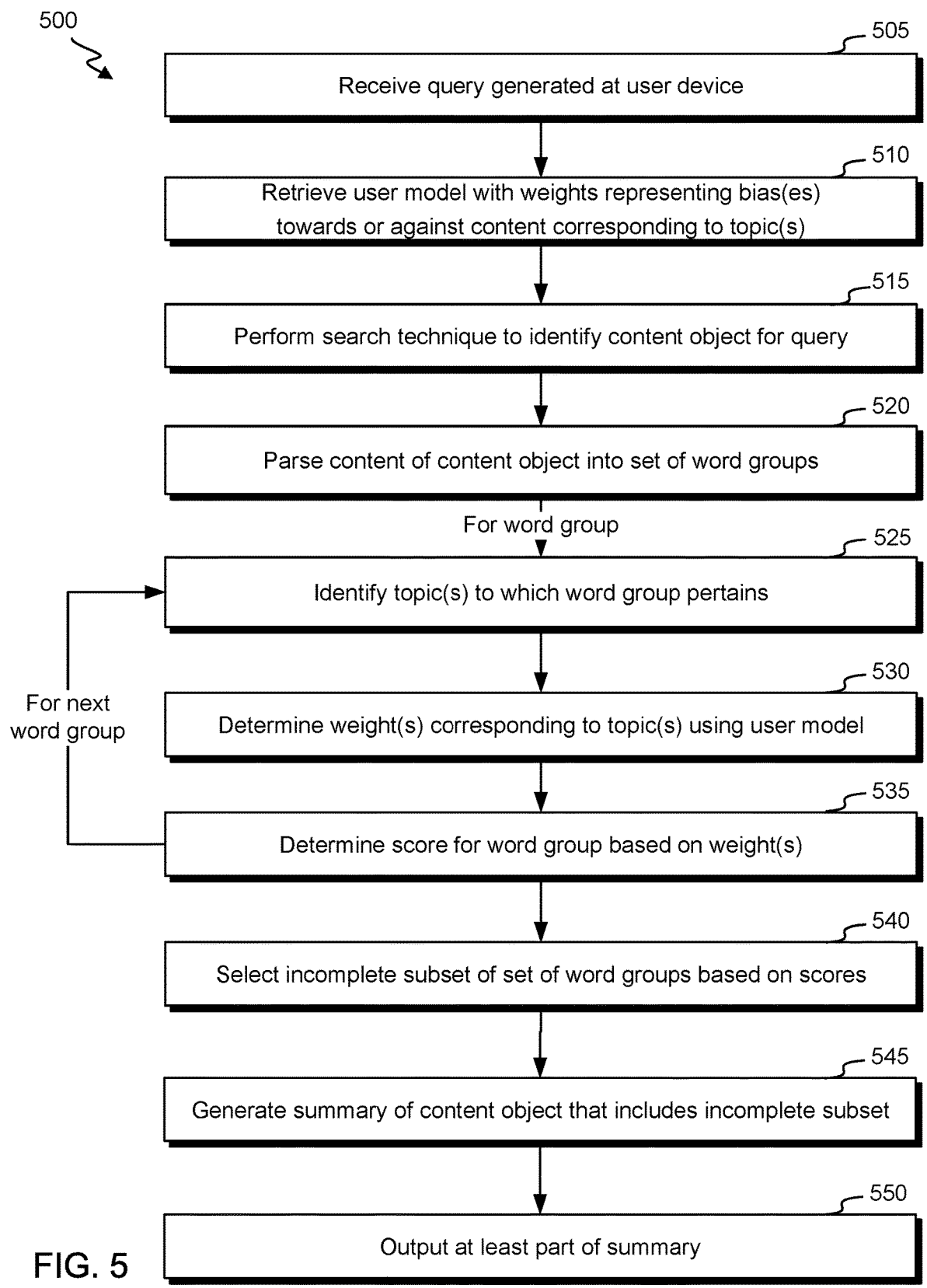
FIG. 5 illustrates a flowchart for a process for generating a content-object summary in accordance with an embodiment of the invention.

FIG. 5 illustrates a flowchart for a process 500 for generating a content-object summary in accordance with an embodiment of the invention. Process 500 may be performed by, for example, content source system 110, content delivery system 120 and/or content summarizer system 145.

Process 500 begins at block 505 where a query generated at a user device is received. The query can include one generated, at least in part, based on input (e.g., audio input, keyboard input, touchscreen input, cursor input, etc.)

detected at the user device and/or based on execution of an application at the user device (e.g., a virtual personal assistant).

At block 510, a user model is retrieved. The user model corresponds to the user device that generated the query and/or a user associated with the query. The user model can include a set of weights. Each weight in the set of weights can correspond to a topic and represent an estimated bias of a user (associated with the user model) towards or against content corresponding to the topic. The user model can be generated based on previous interactions with content objects and/or content, previous at least partial presentations of content objects, and/or previous generation of content. For example, an express selection of a content object corresponding to a topic can result in a weight for the topic being increased. As another example, generation (and/or transmission) of content (e.g., a text message, social-media post, etc.) the corresponds to a topic can result in a weight for the topic being increased. As yet another example, a negative user response (e.g., short interaction type, verbal frustration cue, etc.) to presented content corresponding to a topic can result in a weight for the topic being decreased. The user model can be repeatedly updated based on new content-related events.

At block 515, a search technique is performed to identify a content object for the query. The search technique can include an assessment of metadata and/or content of each of a set of content objects (e.g., a set of webpages, such as webpages availed on the Internet) to identify a content object that corresponds to a subject or topic of the query. In some instances, the search technique can further use the user model to determine which content object is identified. In some instances, the search technique can include using a search engine. The content object can include a set of word groups. The content object can include a webpage.

At block 520, content of the content object is parsed into a set of word groups. Parsing the content object into a set of word groups can include parsing the content object into a set of sentences, fragments, and/or in less consistent word-group definitions. The content object can be parsed using one or more grammar rules, such as a rule that divides a content group based on punctuation and/or sentence structure (e.g., based on patterns of parts of speech).

Blocks 525-535 can then be performed for each word group of the set of word groups. At block 525, it is determined which one or more topics to which the word groups pertain. The determination can be based on mapping words in the word group to positions in an ontology. The determination can additionally or alternatively be based on a linguistic model. In some instances, it can be further determined a degree to which a word group corresponds to each of the one or more topics.

At block 530, for each topic of the one or more topics, a weight for the topic is identified using user model. At block 535, a score for the word group is determined based on the weight(s). The score may be further determined based on one or more topics associated with the query. For example, an additional weighting may be applied, such that each word group associated with a same topic as a query are positively affected. Scores may also be influenced based on, for example, positions of the word groups within a content object. A score can include a ranking, real number, integer, bounded number, unbounded number, category, etc.

At block 540, an incomplete subset of the set of word groups is selected based on the scores of the word groups. The incomplete subset can be selected based on a summarization rule, which may identify (for example) a fixed number of word groups to include in a summary, an upper and/or lower bound on a number of word groups (or words or characters) in a summary, and/or a score threshold. A summarization rule can further include grammar and/or structure rules, such as a rule that biases word-group inclusion in the subset when they are positioned towards a beginning of a content object, section and/or paragraph.

At block 545, a summary of the content object is generated that includes incomplete subset of word groups. The generation can include ordering the word groups. The word groups can be ordered based on a rule, such as a rule that orders word groups based on the positions in a content object and/or based on scores of the word groups. It will be appreciated that, while in some instances a summary can include an exact inclusion of at least part of each word group in the subset, in some instances, a subset may include an abstracted version of each of one or more word group in the subset.

At block 545, at least part of the summary is output. For example, the summary can be transmitted to a user device and/or presented (e.g., via a visual or audio signal) at a user device.

Thus, various embodiments in the invention facilitate generation of a custom summary of a content object. Generation of summaries based on user models can facilitate processing and/or filtering large amounts of content to identify reduced data sizes relevant to specific queries.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for generating summaries of content objects, the method comprising:
    parsing content of a content object into a set of word groups;
    for a word group of the set of word groups:
        identifying at least one topic to which the word group pertains;
        determining, via a user model, at least one weight representative of a bias of a particular user toward or against a topic relative to baseline data; and
        determining a score for the word group based on the at least one weight;
    selecting a subset of the set of word groups based on the score for the word group;
    generating a summary of the content object that includes the subset but does not include one or more other word groups in the set of word groups that are not in the subset; and
    outputting at least part of the summary of the content object.

2. The computer-implemented method for generating summaries of content objects in response to queries as recited in claim 1, wherein the query is received at a query time during a session, the method further comprising:
    identifying a communication received from a user device in the session;
    generating, based on the communication, a new or updated weight for a topic for which it has been identified that a word group of the set of word groups pertains, wherein the score for the word group is based on the new or updated weight.

3. The computer-implemented method for generating summaries of content objects in response to queries as recited in claim 1, further comprising:
    receiving a query generated at a user device, wherein identifying the content object includes performing a search technique to identify one or more content objects estimated as including information corresponding to the query, the one or more content objects including the content object.

4. The computer-implemented method for generating summaries of content objects in response to queries as recited in claim 1, wherein a weight of the at least one weight for a word group of the set of word groups is further based on the query.

5. The computer-implemented method for generating summaries of content objects in response to queries as recited in claim 1, wherein the user model is generated by:
    identifying one or more content objects previously accessed or at least partly generated by a user device;
    identifying, for each content object of the one or more content objects, one or more topics to which the content object pertain; and
    for each topic of a plurality of topics, determining a weight of the at least one weight based on a quantity of the one or more content objects pertaining to the topic.

6. The computer-implemented method for generating summaries of content objects in response to queries as recited in claim 1, wherein:
    the query is generated based on a first voice signal detected at a user device; and outputting the at least part of the summary of the content object includes:
    transmitting the at least part of the summary of the content object to the user device; or
    presenting the at least part of the summary of the content object via a second voice signal at the user device.

7. The computer-implemented method for generating summaries of content objects in response to queries as recited in claim 1, wherein:
    the subset of the set of word groups includes multiple word groups; and generating the summary of the content object includes:
    identifying an order for the multiple word groups, the order corresponding to relative positions of the word groups in the content object; and
    combining the multiple word groups in accordance with the order.

8. The computer-implemented method for generating summaries of content objects in response to queries as recited in claim 1, further comprising:
    accessing a summarization rule that indicates a quantity of word groups to be included in the summary of the content object, wherein the subset includes the quantity of word groups, each word group of the quantity of word groups having a score higher than each score in the one or more other word groups.

9. The computer-implemented method for generating summaries of content objects in response to queries as recited in claim 1, further comprising:
 determining that multiple word groups of the set of word groups are in proximity to each other in the content object and pertain to a same topic;
 in response to determining that the multiple word groups are in proximity to each other in the content object and pertain to the same topic:
 positively adjusting a score of a first word group of the multiple word groups, the first word group corresponding to a word group located at a position before a position of each other word group in the multiple word groups.

10. A system for generating summaries of content objects, the system including:
 one or more data processors; and
 a non-transitory computer readable storage medium containing instructions which when executed on the one or more data processors, cause the one or more data processors to perform actions including:
 parsing content of a content object into a set of word groups;
 for a word group of the set of word groups:
  identifying at least one topic to which the word group pertains;
  determining, via a user model, at least one weight representative of a bias of a particular user toward or against a topic relative to baseline data; and
  determining a score for the word group based on the at least one weight;
 selecting a subset of the set of word groups based on the score for the word group;
 generating a summary of the content object that includes the subset but that does not include one or more other word groups in the set of word groups that are not in the subset; and
 outputting at least part of the summary of the content object.

11. The system for generating summaries of content objects in response to queries as recited in claim 10, wherein the actions further include:
 receiving a query generated at a user device, wherein identifying the content object includes performing a search technique to identify one or more content objects estimated as including information corresponding to the query, the one or more content objects including the content object.

12. The system for generating summaries of content objects in response to queries as recited in claim 10, wherein the query is received at a query time during a session, wherein the actions further include:
 identifying a communication received from a user device in the session; generating, based on the communication, a new or updated weight for a topic for which it has been identified that a word group of the set of word groups pertains, wherein the score for the word group is based on the new or updated weight.

13. The system for generating summaries of content objects in response to queries as recited in claim 10, wherein a weight of the at least one weight for a word group of the set of word groups is further based on the query.

14. The system for generating summaries of content objects in response to queries as recited in claim 10, wherein the user model is generated by:
 identifying one or more content objects previously accessed or at least partly generated by a user device;
 identifying, for each content object of the one or more content objects, one or more topics to which the content object pertain; and
 for each topic of a plurality of topics, determining a weight of the at least one weight based on a quantity of the one or more content objects pertaining to the topic.

15. The system for generating summaries of content objects in response to queries as recited in claim 10, wherein:
 the query is generated based on a first voice signal detected at a user device; and
 outputting the at least part of the summary of the content object includes:
 transmitting the at least part of the summary of the content object to the user device; or
 presenting the at least part of the summary of the content object via a second voice signal at the user device.

16. The system for generating summaries of content objects in response to queries as recited in claim 10, wherein:
 the subset of the set of word groups includes multiple word groups; and
 generating the summary of the content object includes:
 identifying an order for the multiple word groups, the order corresponding to relative positions of the word groups in the content object; and
 combining the multiple word groups in accordance with the order.

17. The system for generating summaries of content objects in response to queries as recited in claim 10, wherein the actions further include:
 accessing a summarization rule that indicates a quantity of word groups to be included in the summary of the content object, wherein the subset includes the quantity of word groups, each word group of the quantity of word groups having a score higher than each score in the one or more other word groups.

18. The system for generating summaries of content objects in response to queries as recited in claim 10, wherein the actions further include:
 determining that multiple word groups of the set of word groups are in proximity to each other in the content object and pertain to a same topic;
 in response to determining that the multiple word groups are in proximity to each other in the content object and pertain to the same topic:
 positively adjusting a score of a first word group of the multiple word groups, the first word group corresponding to a word group located at a position before a position of each other word group in the multiple word groups.

19. A computer-program product tangibly embodied in a non-transitory machine-readable storage medium, including instructions configured to cause one or more data processors to perform actions including:
 parsing content of a content object into a set of word groups;
 for a word group of the set of word groups:
  identifying at least one topic to which the word group pertains;
  determining, via a user model, at least one weight representative of a bias of a particular user toward or against a topic relative to baseline data; and
  determining a score for the word group based on the at least one weight;
 selecting a subset of the set of word groups based on the score for the word group;

generating a summary of the content object that includes the subset but that does not include one or more other word groups in the set of word groups that are not in the subset; and outputting at least part of the summary of the content object.

20. The computer-program product as recited as recited in claim 19, further comprising:

receiving a query generated at a user device, wherein identifying the content object includes performing a search technique to identify one or more content objects estimated as including information corresponding to the query, the one or more content objects including the content object.

* * * * *